United States Patent [19]
Unterhuber

[11] Patent Number: 5,911,297
[45] Date of Patent: Jun. 15, 1999

[54] STOP, PARTICULARLY FOR AUTOMATIC PROCESSING OR CONVEYING APPARATUSES

[75] Inventor: Sebastian Unterhuber, Köngen, Germany

[73] Assignee: Helmut Worner, Denkendorf, Germany

[21] Appl. No.: 08/816,045

[22] Filed: Mar. 11, 1997

[30] Foreign Application Priority Data

Apr. 23, 1996 [EP] European Pat. Off. .............. 96106326

[51] Int. Cl.⁶ .................................................. B65G 13/00
[52] U.S. Cl. ...................................................... 193/35 A
[58] Field of Search ....................... 193/35 A; 198/345.1, 198/345.3, 463.4, 531

[56] References Cited

U.S. PATENT DOCUMENTS

| | | | |
|---|---|---|---|
| 5,109,971 | 5/1992 | Riner | 193/35 A |
| 5,168,976 | 12/1992 | Kettelson | 193/35 A X |
| 5,211,276 | 5/1993 | Clopton | 193/35 A X |

FOREIGN PATENT DOCUMENTS

| | | |
|---|---|---|
| 0036955 | 10/1981 | European Pat. Off. . |
| 0484648 | 5/1992 | European Pat. Off. . |
| 0533083 | 3/1993 | European Pat. Off. . |

*Primary Examiner*—James R. Bidwell
*Attorney, Agent, or Firm*—Browdy and Neimark

[57] ABSTRACT

A stop, particularly for automatic processing or conveying apparatuses, has a stop member (28) for objects moving in a plane of movement in a work movement direction (29) disposed on a base body (10). The stop member (28) is pivotably seated on a holding element (27) so as to be moved in and out of the plane of movement by a control member (16) and to pivot about a pivoting shaft (32). The holding element can be moved, together with the stop member (28), by the control member (16). A first region (34) of the stop member (28) that extends downwardly from the pivoting shaft (32) holds the stop member in its pivoted working position. In this position, a second region (35) of the stop member (28) projects into the plane of movement when the control element (16) is not actuated. A support element (33) for the stop member (28), which is disposed on the holding element (27), only permits a pivoting movement of the second region (35) counter to the work movement direction (29); this second region (35) is configured such that it is pivoted out of the pivoted working position by a force perpendicular to the work movement direction (29) and perpendicular to the pivoting shaft (32). Consequently, the support element (33) can immediately be pivoted back up after a brief actuation of the control cylinder (16), and is then pivoted about the pivoting shaft (32) by means of a force effect caused by the object, which is still located above it, so that it can slide along the underside of the object.

3 Claims, 2 Drawing Sheets

STOP, PARTICULARLY FOR AUTOMATIC PROCESSING OR CONVEYING APPARATUSES

BACKGROUND OF THE INVENTION

1. Technical Field of the Invention

The invention relates to a stop, particularly for automatic processing or conveying apparatuses, having a stop member for objects moving in a plane of movement in a direction of work movement, the stop being disposed on a base body and moving out of and back into the plane of movement by means of a control member.

2. Prior Art

A stop of this type is known from, for example, European Patent EP 0484648. This known stop is mounted, for example, at the plane of movement of moving objects in such way that the stop member projects into the plane of movement in the non-actuated state of the control member. If an object now reaches the stop member, it is held in the corresponding stopped position. When the object is to be moved further, the control member is actuated, and the stop member pivots out of the plane of movement, so that the object can continue moving in the direction of movement. After the object has passed, the stop member pivots back into the plane of movement, so that the next object is again held in the corresponding stopped position, for example to be processed, loaded, unloaded or the like. The drawback of the known arrangement is that the stop member cannot be pivoted back into the plane of movement until it has been passed completely by the object that it has just released. Therefore, a time control or a delay device must be created to correspondingly delay the return movement of the control member.

OBJECT AND SUMMARY OF THE INVENTION

An object of the present invention is to improve a stop of the generic type mentioned at the outset such that a delay of the return movement of the control member can be omitted entirely.

In accordance with the invention, this object is accomplished in that the stop member is seated on a holding element so as to pivot about a pivoting shaft, which element can be moved, together with the stop member, by the control member, with a first region of the stop member that extends downwardly from the pivoting shaft holding the stop member in its pivoted working position by means of the effect of gravity, and/or with a spring holding the stop member by means of a spring force. A second region of the stop member projects into the plane of movement in the pivoted working position when the control member is not actuated. A support element for the stop member is disposed on the holding element and only permits a pivoting movement of the second region (35) of the stop member (28) counter to the work movement direction. The second region is configured such that, under the effect of a force, it is pivoted out of the pivoted working position, perpendicular to the work movement direction and perpendicular to the pivoting shaft.

The particular advantage of this stop is that the control member can be returned immediately after control member actuation in order to move the stop member out of the plane of movement of the objects, without collisions between the stop member and the relevant object being of concern. This is possible because, when the control member is immediately returned, the stop member comes in contact with the relevant object, which leads to a force effect on the second region of the stop member, causing the stop member to be pivoted out of the pivoted working position. Immediately after the object has passed, this force effect ends, and the stop member returns automatically to the working pivoting position, as dictated by gravity and/or a spring force, in order to be able to serve as a stop for the next object. Therefore, only a brief actuation of the control member is necessary to release an object; no special measures, such as time or delay members, need to be taken to return the control member. A simple actuating signal whose length can vary is sufficient. Consequently, it is not necessary to make adaptations to differently-shaped objects that reach the stop in succession. This omission of an adaptation leads to further cost reduction and a reduction of the expenditure for labor in the stop of the invention.

The location of the second region of the stop member that projects the furthest from the pivoting shaft, perpendicular to the work movement direction and the plane of movement, forms the location of the force effect and is offset, with respect to the pivoting shaft, counter to the work movement direction in order to generate a torque with the force effect that results in the desired pivoting out of the pivoted working position.

To improve the transmission of force and facilitate the pivoting process, a roller for absorbing the force effect is advantageously rotatably seated on the stop member.

In an advantageous structural embodiment, the stop member is pivotably seated in a slot-like recess of the holding element, with the holding element preferably comprising two bearing regions that are disposed one on each side of the slot-like recess and connected to one another by the stop element.

The first region of the stop member is advisably shaped and distributed with respect to mass so as to hold the stop member in contact with the support element due to the effect of gravity, so that a defined stop point can always be predetermined.

To pivot the stop member out of the plane of movement by means of the control member, a pivoting part that is connected to the holding element and can pivot by means of the particularly fluidly-actuatable control member is disposed on or in the base body. This pivoting part can, in a known manner, include a movement-damping device, with at least one damping member being connected to the holding element by way of a rod-like connecting member. The damping member is advisably configured as a damping piston that particularly possesses a fluid restoring device in order to effect a return to the damping position.

BRIEF DESCRIPTION OF THE DRAWINGS

An embodiment of the invention is illustrated in the drawings and described in detail in the following description. Shown are in.

DETAILED DESCRIPTION OF THE PREFERRED EMBODIMENT(S) OF THE INVENTION

Figure 1:
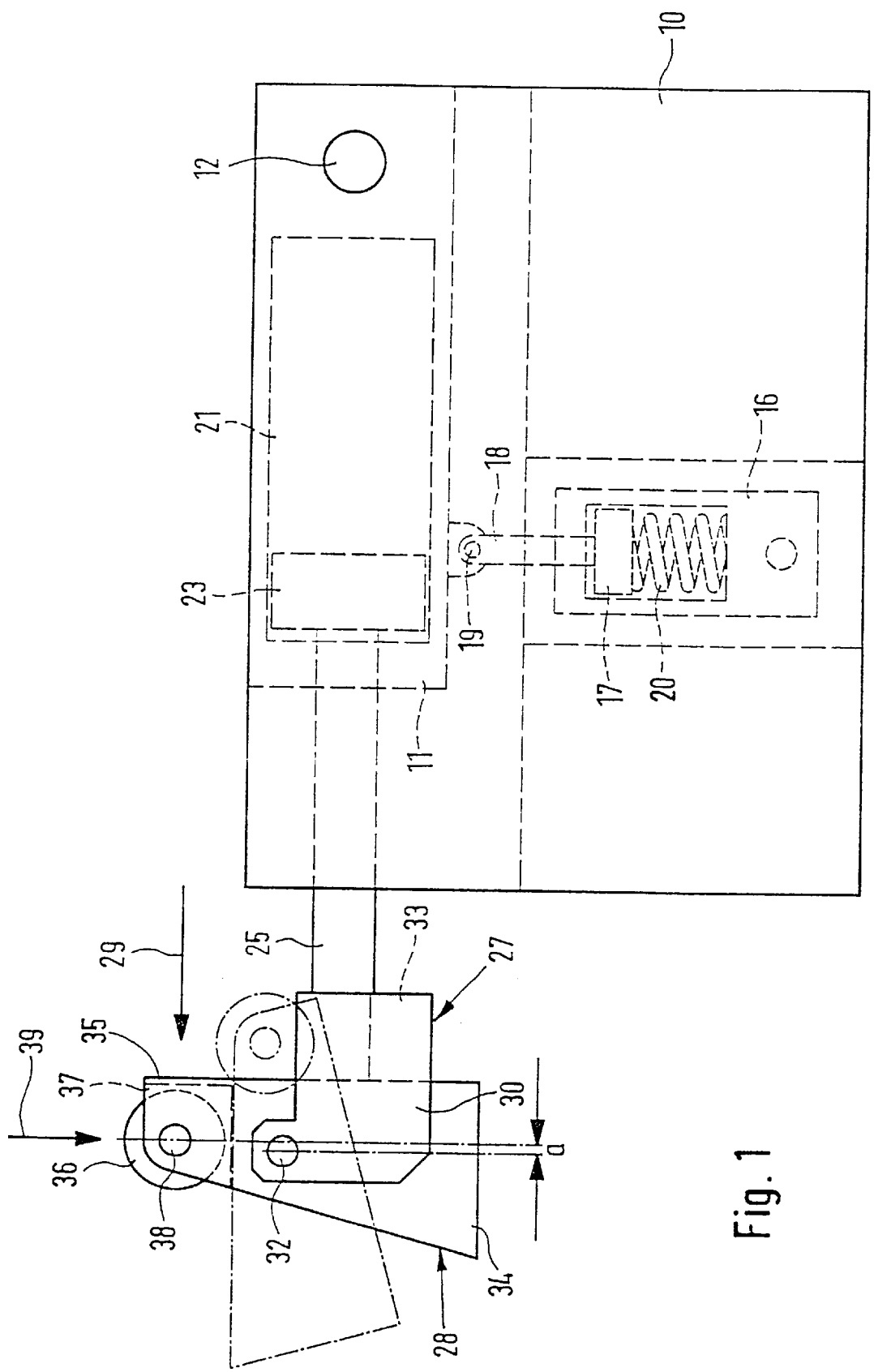
FIG. 1 a side view of a stop as an embodiment of the invention.
Figure 2:
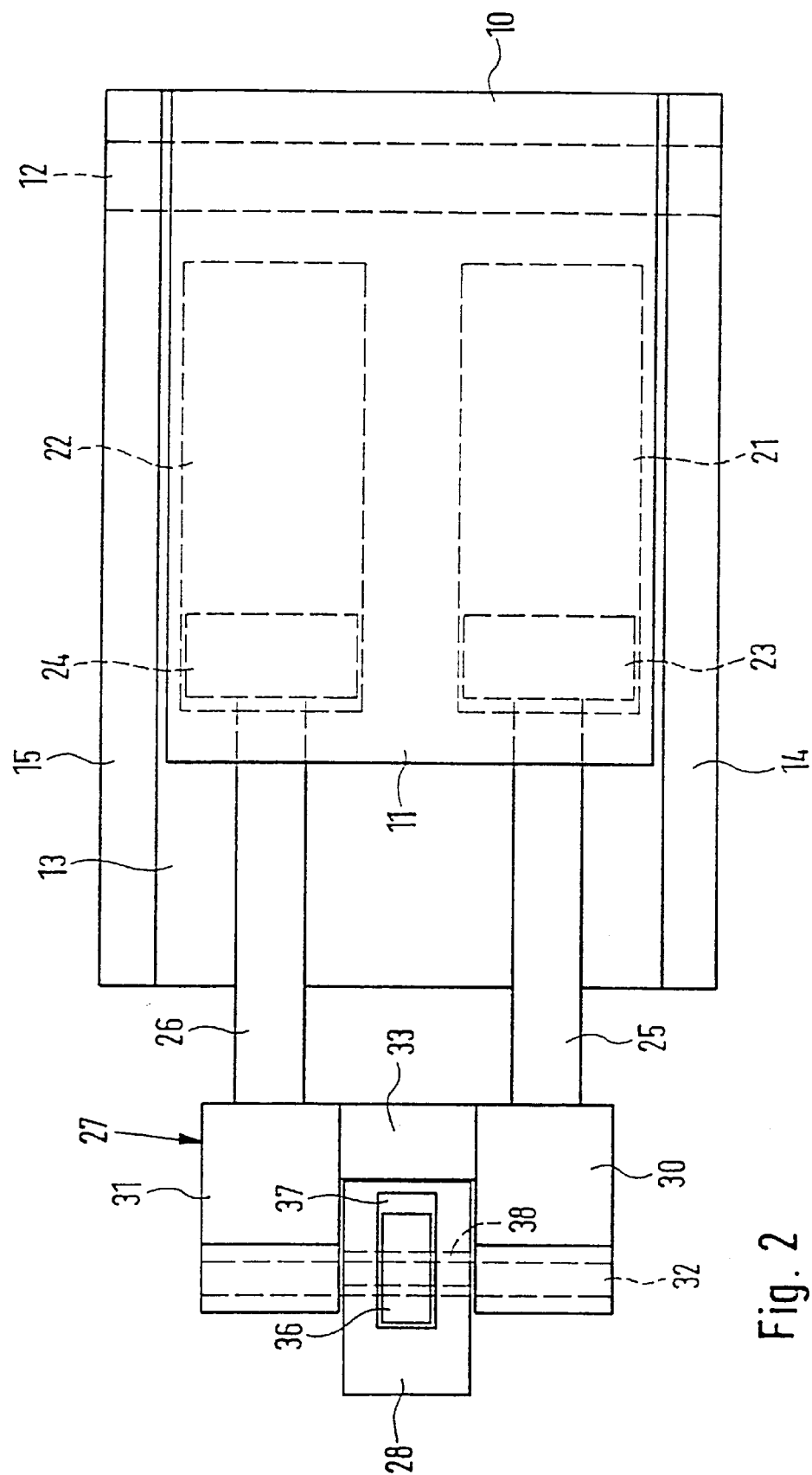
FIG. 2 a plan view of the stop illustrated in FIG. 1.

In the embodiment of a stop shown in FIGS. 1 and 2, a pivoting part 11 is seated so as to pivot about a shaft 12 in an essentially rectangular base body 10. The pivoting part 11 is disposed in a corresponding recess 13 in the upper region of the base body 10; this recess 13 is limited by two lateral, residual, longitudinal walls 14, 15, by means of which the shaft 12 is held.

The pivoting part 11 is moved by a pneumatic (or hydraulic) control cylinder 16, which is disposed beneath the pivoting part 11 in the base body 10. In its interior, the cylinder has a pneumatically-actuatable piston 17, whose piston rod 18 is connected to the pivoting part 11 by way of a pivot 19. The piston 17 is held in its uppermost position by a restoring spring 20; in this position, the top side of the base body 10 is disposed essentially horizontally in the base body 10, and the top side of the base body 10 essentially forms a plane with the top side of the pivoting part 11. If the control cylinder 16 is actuated, the piston 17 moves downwardly, counter to the force of the restoring spring 20, and thereby pivots the pivoting part 11 about the shaft 12. After actuation of the control cylinder 16 has ended, the piston 17 is guided back into its upper position by the restoring spring 20.

Two damping cylinders 21, 22 disposed parallel and adjacent to one another are integrated into the pivoting part 11. Their damping pistons 23, 24 are provided with piston rods 25, 26, which support at their free end a holding element 27 for a stop member 28. The stop member 28 serves as a stop for objects moving in a plane of movement above the base body 10 in a working pivoting direction 29, for example in a processing or conveying apparatus. If an object of this type, not shown in the figures, reaches the stop member 28, its movement is first damped or braked by the damping cylinders 21, 22 as the damping pistons 23, 24 are moved out of their right position in the damping cylinders 21, 22 and into the illustrated left position. if a processing, loading or unloading process has been performed for the relevant object, the control cylinder 16 is actuated in order to pivot the stop member 28 out of the plane of movement of the objects. The object then continues its working movement and, after actuation of the control cylinder 16 has ended, the stop member 28 is pivoted back into its pivoted working position.

The above-described functions and operating cycles are already known from EP 0484648, which was cited at the outset. This document also discloses and describes structural alternatives for the damping device and the control cylinder. The configuration of the damping device and the control cylinder 16 can be greatly varied; in the simplest case, the damping device can even be omitted. What is essential is solely the possibility of pivoting the stop member 28 out of the plane of movement of the objects moving in the work movement direction 29, and the return pivoting process into the pivoted working position.

The holding element 27 comprises two lateral, plate-like bearing regions 30, 31 for a pivoting shaft 32, on which the stop member 28 is pivotably seated between the two bearing regions 30, 31. The distance between the two bearing regions 30, 31 is predetermined by a support element 33 that connects the two bearing regions 30, 31. Thus, a slot-like recess for the stop member 28 is formed between, the two bearing regions 30, 31. Each bearing region 30, 31 is rigidly connected to one of the two piston rods 25, 26.

The stop member 28 disposed so as to pivot between the two bearing regions 30, 31 is likewise essentially plate-like, and has a first region 34 that extends downwardly in the illustrated pivoted working position, and a second region 35 that extends upwardly. The first region 34 rests with its rear, vertical wall facing the base body 10 against the support element 33, while the oppositely located, front wall extends at an incline, so that the first region 34 consequently expands toward the bottom. The overall mass distribution of the first region 34 or the stop member 28 resulting from the expansion effects a torque by means of which the stop member 28 is kept in contact with the support element 33 without the effect of other forces. Of course, this torque can also be achieved with a different shape or mass distribution, and/or with a spring. If this torque is to be produced solely with a spring, the described expansion can, of course, be omitted.

In a corresponding recess 37 in the second, upper region 35, a roller 36 is rotatably seated on a shaft 38 that extends parallel to the pivoting shaft 32. In the illustrated pivoted working position, the roller 36 projects out of the stop member 28, that is, in a direction perpendicular to the work movement direction 29 toward the plane of movement of the objects. It is significant that the shaft 38 is offset, with respect to the pivoting shaft 32, counter to the work movement direction 29—in the illustrated embodiment, by the segment a. Consequently, when a force effect from force direction 39 acts on the roller 36 from above, this effects a pivoting process of the stop member 28 about the pivoting shaft 32. This second, pivoted position resulting from the force effect is illustrated in dashed lines in FIG. 1.

If an object being held by the stop member 28 is now released by means of a brief actuation of the control cylinder 16, the stop member 28 first pivots downwardly out of the illustrated pivoted working position, to be pivoted back up immediately. Because the object, which is still moving, is located above the stop member 28 at this time, it exerts a force on the roller 36 from above, which causes the stop member 28 to pivot about the pivoting shaft 32 and into the pivoted position shown in dashed lines. The roller 36 then rolls along the underside of the object. After the object has passed, the stop member 28 is automatically returned to the vertical pivoted working position and is again ready to serve as a stop for the next object.

In a modification of the illustrated embodiment, a simpler embodiment would not include the roller 36, so that a correspondingly rounded region of the stop member 28 slides along the respective object. Moreover, a single damping cylinder could, of course, be provided in accordance with the cited prior art, in which instance—as already discussed—a damping device could be omitted entirely.

The foregoing description of the specific embodiments will so fully reveal the general nature of the invention that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation.

What is claimed is:

1. A stop for automatic processing or conveying apparatuses, said stop comprising a stop member for objects moving in a plane of movement in a work movement direction (29), the stop member being pivotably engaged on a base body and control member means for pivoting said stop member, into and out of the plane of movement wherein the stop member (28) is pivotably seated on a holding element (27) about a pivoting shaft (32), the holding element being movable together with the stop member (28) by the control member means (16), wherein a first region (34) of the stop member (28) extends downwardly from the pivoting shaft (32) to hold the stop member (28) in a pivoted working position, and a second region (35) of the stop member (28) projects into the plane of movement when the control element (16) is not actuated, a support element (33) for the stop member (28), said support element being disposed on the holding element (27) to only permit a pivoting movement a pivoting movement of the second region (35) counter to the work movement direction (29), wherein said second region (35) is configured such that it is pivoted out of the pivoted working position when a force is applied to said second region from a direction perpendicular to the work movement direction (29) and perpendicular to the pivoting shaft (32); and wherein a location of the second region (35) of the stop member (28) that projects the furthest from the pivoting shaft (32), perpendicular to the work movement direction (29) and the plane of movement, forms the location where the force is applied to pivot the second region out of the pivoted working position, counter to the work movement direction (29), said location being offset with respect to the pivoting shaft (32).

2. A stop for automatic processing or conveying apparatuses, said stop comprising a stop member for objects moving in a plane of movement in a work movement direction (29), the stop member being pivotably engaged on a base body and control member means for pivoting said stop member, into and out of the plane of movement wherein the stop member (28) is pivotably seated on a holding element (27) about a pivoting shaft (32), the holding element being movable together with the stop member (28) by the control member means (16), wherein a first region (34) of the stop member (28) extends downwardly from the pivoting shaft (32) to hold the stop member (28) in a pivoted working position, and a second region (35) of the stop member (28) projects into the plane of movement when the control element (16) is not actuated, a support element (33) for the stop member (28), said support element being disposed on the holding element (27) to only permit a pivoting movement a pivoting movement of the second region (35) counter to the work movement direction (29), wherein said second region (35) is configured such that it is pivoted out of the pivoted working position when a force is applied to said second region from a direction perpendicular to the work movement direction (29) and perpendicular to the pivoting shaft (32);

wherein the stop member (28) is pivotably seated in a slot-like recess of the holding element (27); and wherein the holding element comprises two bearing regions (30, 31) that are disposed one on each side of the slot-like recess and are connected to one another by the support element (33).

3. A stop for automatic processing or conveying apparatuses, said stop comprising a stop member for objects moving in a plane of movement in a work movement direction (29), the stop member being pivotably engaged on a base body and control member means for pivoting said stop member, into and out of the Plane of movement wherein the stop member (28) is pivotably seated on a holding element (27) about a pivoting shaft (32), the holding element being movable together with the stop member (28) by the control member means (16), wherein a first region (34) of the stop member (28) extends downwardly from the pivoting shaft (32) to hold the stop member (28) in a pivoted working position, and a second region (35) of the stop member (28) projects into the plane of movement when the control element (16) is not actuated, a support element (33) for the stop member (28), said support element being disposed on the holding element (27) to only permit a pivoting movement a pivoting movement of the second region (35) counter to the work movement direction (28), wherein said second region (35) is configured such that it is pivoted out of the pivoted working Position when a force is applied to said second region from a direction perpendicular to the work movement direction (29) and perpendicular to the pivoting shaft (32);

wherein the first region (34) holds the stop member (28) in the pivoted working position by gravity; and wherein the first region (34) of the stop member (28) has a shape and mass distribution that keep the member in contact with the support element (33) by means of the effect of gravity.

\* \* \* \* \*